(12) United States Patent
Sarramoune et al.

(10) Patent No.: US 10,183,366 B2
(45) Date of Patent: Jan. 22, 2019

(54) FEEDER MECHANISM FOR FEEDING MECHANICAL FASTENERS

(71) Applicant: Alema Automation, Merignac (FR)

(72) Inventors: Pierre Sarramoune, Merignac (FR); Alain Py, Merignac (FR)

(73) Assignee: KUKA Systems Aerospace, Le Haillan (FR)

( * ) Notice: Subject to any disclaimer, the term of this patent is extended or adjusted under 35 U.S.C. 154(b) by 16 days.

(21) Appl. No.: 15/536,175

(22) PCT Filed: Dec. 17, 2015

(86) PCT No.: PCT/EP2015/080256
§ 371 (c)(1),
(2) Date: Jun. 15, 2017

(87) PCT Pub. No.: WO2016/102305
PCT Pub. Date: Jun. 30, 2016

(65) Prior Publication Data
US 2018/0009074 A1    Jan. 11, 2018

(30) Foreign Application Priority Data

Dec. 22, 2014  (EP) .................................. 14307141

(51) Int. Cl.
*B23P 19/00* (2006.01)
*B65G 51/02* (2006.01)
(Continued)

(52) U.S. Cl.
CPC ............ *B23P 19/005* (2013.01); *B21J 15/32* (2013.01); *B23P 19/002* (2013.01); *B65G 51/02* (2013.01); *B21J 15/142* (2013.01)

(58) Field of Classification Search
CPC ...... B23P 19/002; B23P 19/003; B23P 19/005
(Continued)

(56) References Cited

U.S. PATENT DOCUMENTS 2,874,999 A * 2/1959 Lofgren ................. B65G 53/20
406/120
3,272,396 A * 9/1966 Neville, Jr. ............... A61J 3/07
222/267

(Continued)

FOREIGN PATENT DOCUMENTS

CN    101345147 A    1/2009
CN    102284668 A    12/2011
(Continued)

OTHER PUBLICATIONS

European Patent Office; Search Report in International Patent Application No. PCT/EP2015/080256 dated Mar. 8, 2016; 2 pages.
(Continued)

*Primary Examiner* — Joseph A Dillon, Jr.
(74) *Attorney, Agent, or Firm* — Wood Herron & Evans LLP (57) ABSTRACT

A feeder mechanism for feeding mechanical fasteners, such as rivets, screws, bolts and similar fasteners, as well as to a robot end effector comprising such a mechanism and a robot being equipped with such an end effector. The feeder mechanism includes a transport means for transporting mechanical fasteners and a stopping and aligning unit with a stopping plate to decelerate transported fasteners.

16 Claims, 7 Drawing Sheets

(51) Int. Cl.
*B21J 15/32* (2006.01)
*B21J 15/14* (2006.01)

(58) Field of Classification Search
USPC .............................. 406/74, 83, 178, 180, 192
See application file for complete search history.

(56) References Cited

U.S. PATENT DOCUMENTS

| | | | | | |
|---|---|---|---|---|---|
| 3,471,203 | A | * | 10/1969 | Farnworth | B65G 53/4683 406/76 |
| 3,889,343 | A | * | 6/1975 | Miller | B23P 19/003 29/240 |
| 4,208,153 | A | * | 6/1980 | Trethewy | B21J 15/32 221/124 |
| 4,466,761 | A | * | 8/1984 | Beltrop | B65G 51/34 406/112 |
| 4,502,215 | A | * | 3/1985 | Davis | B65G 51/035 140/147 |
| 4,830,547 | A | * | 5/1989 | Boob | B21J 15/32 221/233 |
| 4,843,900 | A | * | 7/1989 | Jangaard | B23P 19/003 74/110 |
| 5,480,087 | A | * | 1/1996 | Young | B23P 19/003 221/268 |
| 6,196,414 | B1 | * | 3/2001 | Ferenczi | B21J 15/32 221/123 |
| 6,443,669 | B2 | * | 9/2002 | Saito | H05K 13/021 198/390 |
| 6,951,298 | B1 | * | 10/2005 | Cogley | B21J 15/32 227/112 |
| 2001/0052173 | A1 | * | 12/2001 | Coonrod | B21J 15/32 29/243.53 |
| 2005/0271493 | A1 | * | 12/2005 | Weber | B21J 15/32 411/112 |
| 2008/0193230 | A1 | * | 8/2008 | Dear | B21J 15/34 406/191 |
| 2008/0244888 | A1 | | 10/2008 | Sarh | |
| 2008/0310927 | A1 | * | 12/2008 | Remonnay | H01L 21/67121 406/84 |
| 2011/0170961 | A1 | * | 7/2011 | Shinjo | B23P 19/003 406/83 |
| 2012/0301262 | A1 | | 11/2012 | Ivo et al. | |
| 2013/0071209 | A1 | * | 3/2013 | Schug | B21J 15/32 414/222.01 |
| 2014/0030032 | A1 | * | 1/2014 | Kuhn | B21J 15/32 406/196 |

FOREIGN PATENT DOCUMENTS

| | | |
|---|---|---|
| CN | 202683915 U | 1/2013 |
| CN | 103561884 A | 2/2014 |
| DE | 202008014886 U1 | 4/2010 |
| DE | 102008058946 A1 | 5/2010 |
| EP | 1733821 A1 | 12/2006 |
| EP | 1733821 B1 | 2/2013 |

OTHER PUBLICATIONS

European Patent Office; Written Opinion in International Patent Application No. PCT/EP2015/080256 dated Jun. 22, 2017; 5 pages.
Chinese Patent Office; Examination Report in Chinese Patent Application No. 201580070302.9 dated Aug. 21, 2018; 5 pages.
Chinese Patent Office; Search Report in Chinese Patent Application No. 201580070302.9 dated Aug. 21, 2018; 2 pages.

* cited by examiner

FEEDER MECHANISM FOR FEEDING MECHANICAL FASTENERS

CROSS-REFERENCE

This application is a national phase application under 35 U.S.C. § 371 of International Patent Application No. PCT/EP2015/080256, filed Dec. 17, 2015 (pending), which claims the benefit of European Patent Application No. 14307141.3, filed Dec. 22, 2014, the disclosures of which are incorporated by reference herein in their entirety.

TECHNICAL FIELD

The present invention relates to a feeder mechanism for feeding mechanical fasteners, such as rivets, screws, bolts and similar.

BACKGROUND

In many industrial manufacturing processes, mechanical fasteners, such as rivets, screws, bolts and similar are used to connect or affix two or more objects together. The installation of such mechanical fasteners is often automated by machines or robots that can install mechanical fasteners much quicker and with a higher precision than a human being.

For such automated systems it is necessary to feed the mechanical fasteners quickly and reliably to the actual installation mechanism. This can be done by hand or by means of a supply magazine from which fasteners are gripped, whereas in most instances it is preferred to use appropriate feeder mechanisms. Such feeder mechanism feed the fastener to be installed either directly to the installation mechanism or to a gripping device which picks up the fastener from the feeder mechanism and moves it to another location for further processing or installation.

There are several objectives for such feeder mechanisms. First, they have to transport and feed fasteners in such a way that fasteners are not damaged in any way. Damaging of fasteners is a problem in particular in high speed applications, where a high number of fasteners have to be installed per time instance and are transported at high speeds by the feeder. Furthermore, in certain applications, like in aircraft construction, even slight defects of the fasteners due to the handling of the fasteners might have severe consequences, like impaired aerodynamics and stability. A second problem concerns the alignment of the mechanical fasteners. In automatic installation applications using e.g. a robot, the mechanical fasteners have to be fed to either the installation mechanism or to a gripping device in a defined way, which means in a defined orientation. Furthermore the transfer of the fastener from the feeder mechanism to the installation mechanism or gripping device must be reliable and the rate of tilted or misaligned fasteners must be as low as possible.

From prior art document DE 20 2008 014886 U1 a robot effector is known for installing mechanical fasteners, in particular rivets. Mechanical fasteners are fed to the robot effector from an external supply device via a hose or another transport means, in particular by means of pressurized air. Several types of mechanical fasteners may be stored in the supply device and may be selectively fed to the robot effector.

SUMMARY

In view of the above, it is an object of the present invention to provide an improved feeder mechanism for feeding mechanical fasteners, such as rivets, screws, bolts and similar, that is able to feed mechanical fasteners at high speeds and frequencies while at the same time reduces or avoids damaging the fasteners and provides a reliable and precise feeding of the fasteners.

These and other objects which become apparent when reading the following description are solved by feeder mechanism, a robot effector, and a robot as disclosed herein. Advantageous embodiments are contained in the dependent claims.

According to the invention a feeder mechanism for feeding mechanical fasteners, such as rivets, screws, bolts and similar is provided, which comprises a transport means for transporting mechanical fasteners, preferably by pressurized air and a stopping and aligning unit for mechanical fasteners arranged downstream of the transport means. The stopping and aligning unit comprises a stopping plate which is configured to have at least a first position and second position, wherein in the first position a fastener supplied by the transport means is decelerated, and wherein in the second position the supplied fastener passes the stopping plate. The stopping and aligning unit furthermore comprises at least one aligning jaw being arranged downstream of the stopping plate and being configured to have at least a first position and a second position, wherein in the first position the aligning jaw aligns the supplied fastener, such that it may be picked by a gripping device, and wherein in the second position the aligning jaw releases the supplied fastener. Using the transport means of the inventive feeder mechanism mechanical fasteners can be fed at high speed and frequencies. The stopping and aligning unit reduces or avoids damaging the mechanical fasteners by decelerating them with the stopping plate. Thus, in the first position of the stopping plate, the fasteners impinge on the stopping plate and are decelerated. If the stopping plate transitions to the second position, the fasteners may pass the stopping plate, driven e.g. by gravity or pressurized air. However, since the distance of acceleration is comparably small, the fasteners only accelerate to low speeds until they reaches the aligning jaw arranged downstream of the stopping plate. Hence, damages to the fastener from impinging on the aligning jaw are reduced or avoided.

Furthermore, decelerating the mechanical fasteners before they reach the aligning jaw facilitates alignment of the same in the aligning jaw arranged downstream of the stopping plate. Alignment is achieved by the aligning jaw which provides for a reliable and precise feeding of the fasteners e.g. to a gripping device arranged downstream. To this end, the aligning jaw may firmly align and hold the fasteners in the first position. While in this position, the fasteners may be reliably picked up, e.g. by a gripping device. The transfer of the fasteners from the aligning jaw to e.g. a gripping device is facilitated in the second position of the aligning jaw in which the fasteners are released from the aligning jaw.

In the context of the present description component "B" is said to be "downstream" of component "A", if a mechanical fastener to be fed, first passes component "A" and subsequently component "B".

Preferably, the aligning jaw is configured to have a third position, where-in in the third position an aperture formed by the aligning jaw has an inner diameter which is larger than the outer diameter of a shaft of a supplied fastener, but smaller than the outer diameter of a head of a supplied fastener. Preferably, this third position is adjustable to adjust to different external diameters of the supplied fasteners.

In the third position of the aligning jaw a mechanical fastener, such as e.g. a rivet, may easily be oriented in the right direction, which in general means pointing with its shaft in the downstream direction. As the inner diameter of the aligning jaw is larger than the outer diameter of the shaft of a supplied mechanical fastener in the third position, the shaft may easily penetrate the aligning jaw. However, as the inner diameter of the aligning jaw is smaller than the outer diameter of the head of the fastener, the head may not penetrate the aligning jaw. Consequently, the fastener is oriented in the right direction, yet may not pass the aligning jaw unintentionally.

Further preferably, the stopping plate comprises at least one opening through which a supplied fastener may pass in the second position of the stopping plate.

Providing an opening in the stopping plate allows for a simple, lightweight and comparably inexpensive construction of the stopping plate. Thus, in the first position of the aligning plate, a supplied mechanical fastener impinges on the stopping plate and is decelerated. In practice, this deceleration leads preferably to a stop of the fastener. In the second position, the fastener may pass the opening in the stopping plate.

Further preferably, the stopping plate comprises at least one plastic or rubber element onto which a supplied fastener impinges in the first position of the stopping plate.

Plastic or rubber reduces or avoids the risk of damages to the fasteners, which usually are supplied by the transport means at high speeds.

Preferably, the stopping plate is configured to transition from the second position to the first position, when the aligning jaw is in the third position. Further preferably, the aligning jaw is configured to transition from the third position to the first position, when the stopping plate is in the first position. Still further preferably, the aligning jaw is configured to transition from the first position to the second position, when the stopping plate is in the first position.

Since the stopping plate is in the first position when the aligning jaw transitions through its positions, the transport means is decoupled from the aligning jaw and further fasteners are prevented from entering the aligning jaw, thus avoiding congestion. Furthermore, if e.g. pressurized air is used to transport the fasteners in the transport means, it is pre-vented from entering the aligning jaw as well. Thus, the head of a mechanical fastener oriented in the aligning jaw in the correct position is not further pushed against the aligning jaw when the aligning jaw subsequently transitions to its first position and further subsequently to its second position. This helps to decrease or avoid damages of the mechanical fasteners due to frictional forces.

Preferably, the aligning jaw comprises a first and a second half and the stopping and aligning unit further comprises at least one rail on which at least the first half of the aligning jaw may glide.

Such a construction allows for a simple and cost-effective design of the aligning jaw and a reliable functioning of the same.

Further preferably, the first half of the aligning jaw comprises a cam track and the stopping and aligning unit further comprises a cam plate with at least one pin engaging the cam track, such that a movement of the cam plate causes a movement of the first half of the aligning jaw.

In this way, a linear movement of the cam plate results in a corresponding movement of the aligning jaw. The different positions of the aligning jaw can be caused by a simple linear movement of the cam plate which could for example be driven by a pneumatic cylinder.

Further preferably, the stopping and aligning unit comprises a plurality of aligning jaws, and wherein each jaw is adapted to align fasteners with a specific diameter and/or length.

In this way, different aligning jaws are adapted for different, specific dimensions of the fasteners. Accordingly, handling, alignment and feeding of the fasteners becomes more reliable. Damages due to an inappropriate dimension of the alignment jaw in relation to the fasteners are reduced or avoided.

Preferably, the transport means uses pressurized air to transport the fasteners. Further preferably, the stopping plate and/or the at least one aligning jaw is/are actuated pneumatically or by means of electrical motors. Pressurized air for transport and/or pneumatic actuation can be produced in a simple and cost-effective way and may even already be available with the machine or robot in which the feeder mechanism is to be used. The invention is also directed to a robot effector for installing mechanical fasteners, such as rivets, screws, bolts and similar, comprising a frame supporting the described feeder mechanism.

Preferably, the effector further comprises a gripping device and the feeder mechanism is configured to feed mechanical fasteners, such as rivets, screws, bolts and similar, to the gripping device and wherein the gripping device is arranged rotatably on the frame to move between a first position, where the gripping device grips a mechanical fastener from the feeder mechanism and a second position, where the gripping device provides a gripped mechanical fastener to an installation mechanism.

The invention is also directed to a robot comprising the described robot effector.

BRIEF DESCRIPTION OF THE DRAWINGS

In the following, the invention is described exemplarily with reference to the enclosed figures, in which.

DETAILED DESCRIPTION

Figure 1:
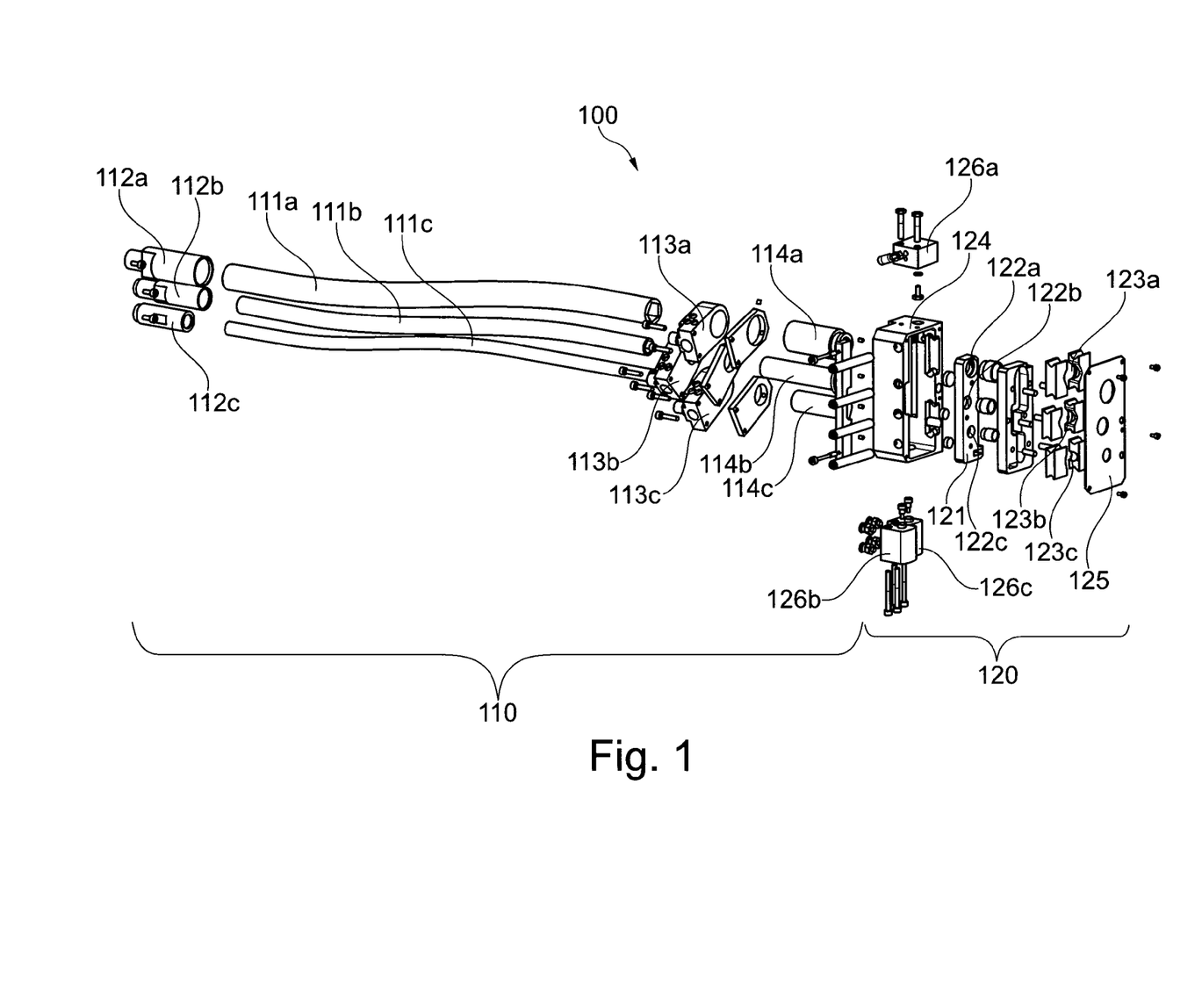
FIG. 1 shows an exploded view of a feeder mechanism according to the invention.

FIG. 1 shows an exploded view of an exemplary feeder mechanism 100 according to the present invention. The feeder mechanism 100 is suitable for feeding mechanical fasteners, such as rivets, screws, bolts and similar. The feeder mechanism 100 comprises a transport means no and a stopping and aligning unit 120, both of which are shown in exploded view as well. The stopping and aligning unit 120 is arranged downstream of the transport means 110, i.e. mechanical fasteners to be fed first pass the transport means 110 and subsequently pass the stopping and aligning unit 120. Consequently, with respect to FIG. 1, fasteners would enter the feeder mechanism 100 from the left and would leave the feeder mechanism 100 on the right.

The transport means 110 shown in FIG. 1 comprises three hoses 111a, 111b and 111c and corresponding holding jackets 112a, 112b and 112c in this exemplary embodiment through which mechanical fasteners are trans-ported. However, a different number of hoses is possible. The hoses 111a, 111b and 111c as well as the corresponding holding jackets 112a, 112b and 112c comprise different diameters for different sizes of mechanical fasteners.

The hoses 111a, 111b and 111c can be made of any suitable material like plastic (e.g. polyvinyl chloride, PVC) or the like. The holding jackets 112a, 112b and 112c affix the hoses 111a, 111 b and 111c to a frame or the like (not shown in FIG. 1) of a robot effector or similar (not shown in FIG. 1). The holding jackets 112a, 112b and 112c can be made of any suitable material like metal or plastic (e.g. Acrylonitrile butadiene styrene, ABS) or the like.

The transport means 110 in the exemplary embodiment of FIG. 1 furthermore comprises ring sensors 113a, 113b and 113c which are arranged downstream of the hoses 111a, 111b and 111c. The ring sensors 113a, 113b and 113c are able to sense the passage of a mechanical fastener. These sensors may be based on inductive or optical detection or a similar concept. If based on inductive detection, a coil in the sensor may sense a modulation of a magnetic field caused by the passage of a mechanical fastener. If based on optical detection, the passage of a mechanical fastener may interrupt a light field at least partially which is detected by suitable detectors, such as photodiodes or the like. The ring sensors 113a, 113b and 113c 113a, 113b and 113c may cause the stopping plate and/or aligning jaws in the aligning unit to move 113a, 113b and 113c as de-scribed with respect to FIG. 2 below, if they sense the passage of a fastener. While in FIG. 1 three ring sensors are shown, their number may vary and correspond e.g. to the number of hoses.

The transport means no in the exemplary embodiment of FIG. 1 furthermore comprises three bushings 114a, 114b and 114c being arranged downstream of the ring sensors 113a, 113b and 113c. The bushings guide the fasteners from the ring sensors 113a, 113b and 113c to the stopping and aligning unit 120. However, it would also be possible, that the ring sensors 113a, 113b and 113c are directly coupled to the stopping and aligning unit 120. The bushings 114a, 114b and 114c can be made of any suitable material like metal (e.g. alloy) or plastic (e.g. Acrylonitrile butadiene styrene, ABS) or the like.

It is to be emphasized that in the exemplary embodiment of FIG. 1 the transport means 110 comprises three separate transport channels, each being formed by one of the three hoses 111a, 111b and 111c, one of the three holding jackets 112a, 112b and 112c, one of the three ring sensors 113a, 113b and 113c and one of the three bushings 114a, 114b and 114c. Each of the three transport channels is optimized by means of the dimension of its components to transport fasteners of a specific size or fasteners of specific sizes. In general, the transport means may comprise any number of separate transport channels, and may even comprise only one transport channel.

Preferably, one of the three hoses, e.g. 111a, is adapted to transport fasteners with a maximum diameter of 3.2 mm to 7 mm; one is adapted (e.g. 111b) to transport fasteners with a maximum diameter of 6 mm to 10.3 mm and one of the tree hoses (e.g. 111c) is adapted to transport fasteners with a maximum diameter of 9.0 mm to 12.7 mm. In the case of rivets, the "maximum diameter" is usually defined by the heads of the rivets. The overlap in the respective ranges can be used to optimize the transport of fasteners with identical diameter but different lengths. For example, a rivet with a maximum diameter of 7 mm can be transported with either hose ma or nib. However, depending on the length of the rivet, one might be better suited than the other.

Furthermore, in the exemplary embodiment of FIG. 1, transport of mechanical fasteners is caused by pressurized air which enters the transport means no from upstream, i.e. from the left side of FIG. 1. However, in general any suitable means for transporting mechanical fasteners could be used, such as gravity, magnetism, a conveyor belt or similar.

In the exemplary embodiment of FIG. 1, a stopping and aligning unit 120 is arranged downstream of the transport means 110. The stopping and aligning unit 120 comprises a stopping plate 121. The stopping plate 121 can be made of any suitable material like metal (e.g. alloy) or plastic (e.g. Acrylonitrile butadiene styrene, ABS) or the like. The stopping plate 121 is configured to have at least a first position and a second position, which will be shown in more detail in FIG. 2. In the first position a fastener supplied by the transport means 110 is decelerated and in the second position the supplied fastener passes the stopping plate 121.

To allow a fastener to pass the stopping plate 121, the stopping plate 121 comprises three openings 122a, 122b and 122c. In the exemplary embodiment of FIG. 1, these openings vary in diameter corresponding to the dimension of the transport channel of the transport means 110 with which the respective opening is associated. Thus, for example the topmost opening 122a in FIG. 1 has the largest diameter and corresponds to, i.e. receives fasteners from, the transport channel being formed by hose 111a, holding jacket 112a, ring sensor 113a and bushing 114a, which is the transport channel with the largest diameter. In general, the stopping plate may have any number of openings corresponding to the number of transport channels, and may even have only a single opening.

The stopping and aligning unit 120 in the exemplary embodiment of FIG. 1 furthermore comprises three aligning jaws 123a, 123b and 123c being arranged downstream of the stopping plate 121. The aligning jaws 123a, 123b and 123c are configured to have at least a first position and a second position as will be explained in more detail with respect to FIG. 2. In the first position the aligning jaws 123a, 123b and 123c align a supplied fastener, such that it may be picked by a gripping device (not shown in FIG. 1), and in the second position the aligning jaws 123a, 123b and 123c release the supplied fastener. The aligning jaws 123a, 123b and 123c can be made of any suitable material like metal (e.g. alloy) or plastic (e.g. Acrylonitrile butadiene styrene, ABS) or the like.

In the exemplary embodiment of FIG. 1, the inner diameters of the aligning jaws 123a, 123b and 123c vary in diameter corresponding to the dimension of the opening 122a, 122b or 122c in the stopping plate 121 and the dimension of the transport channel of the transport means 110 with which the respective aligning jaw 123a, 123b or 123c is associated. Thus, for example the topmost aligning jaw 123a in FIG. 1 has the largest diameter and corresponds to, i.e. receives fasteners from, the opening 122a in the stopping plate 121. In this way, each of the aligning jaws 123a, 123b or 123c may be adapted to align fasteners with a specific diameter and/or length. Preferably, the openings in the jaws have a V-shaped cross-section as shown. Thereby, the gripped fasteners automatically align with respect to their middle axis, and this is achieved independent on the respective diameter of the fastener, since the V-shape is preferably provided in both halves of the jaws.

In general, the stopping and aligning unit may have any number of aligning jaws corresponding to the number of openings in the stopping plate 121 and the number of transport channels, and may even have only a single aligning jaw.

As shown in FIG. 1, the stopping and aligning unit may comprise a housing 124 with a cover plate 125. The stopping plate 121 and the aligning jaws 123*a*, 123*b* and 123*c* may be arranged inside the housing 124 as shown in FIG. 1. Furthermore, the stopping plate 121 and/or the aligning jaws 123*a*, 123*b* and 123*c* may be actuated by corresponding pneumatic cylinders which are shown in FIG. 1 with reference numerals 126*a*, 126*b* and 126*c*, respectively. However, any suitable means for actuating the stopping plate 121 and the aligning jaws 123*a*, 123*b* and 123*c* may be used, such as electrical motors.

Figure 2:
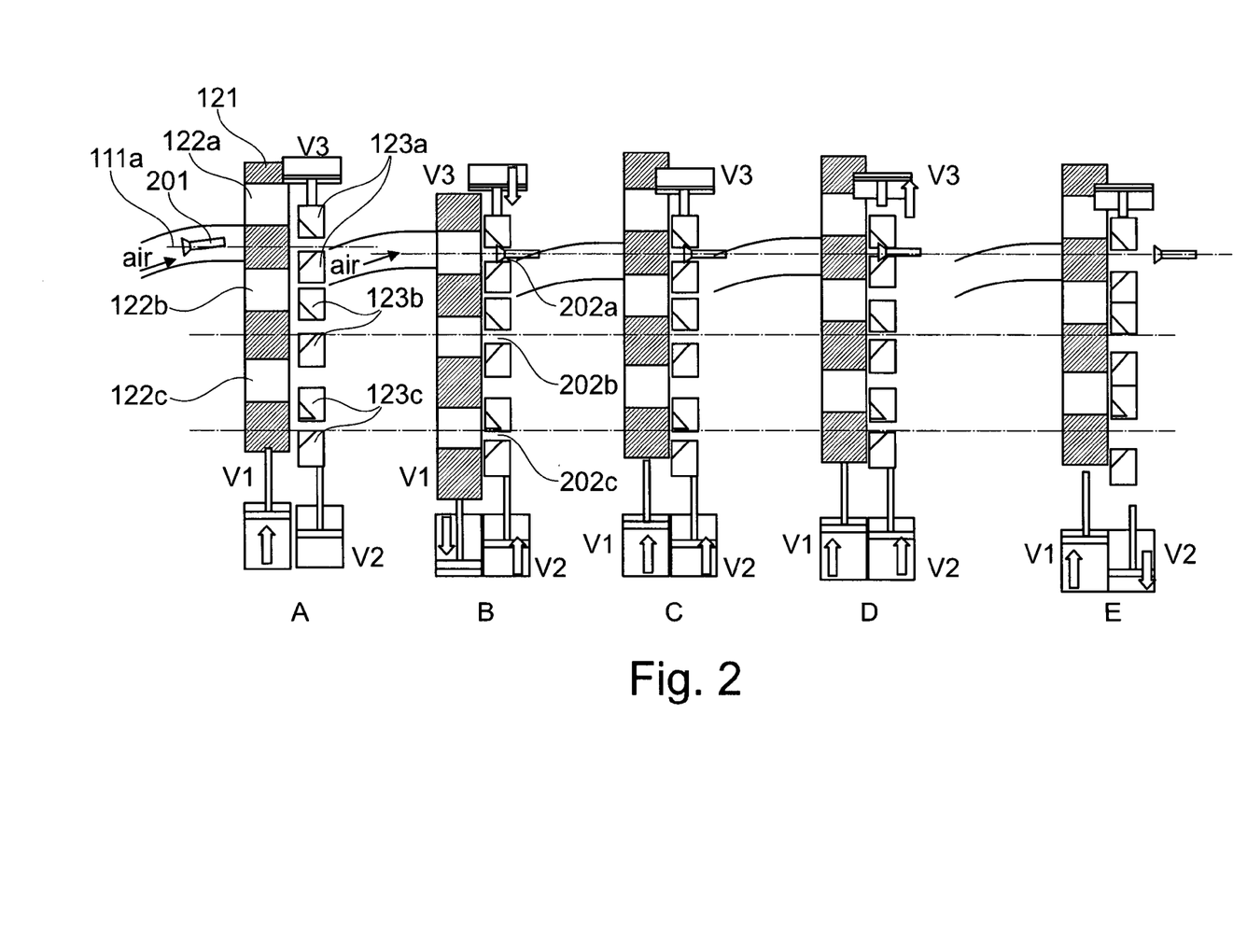
FIG. 2 shows details of the operation of the stopping plate and aligning jaws of the exemplary embodiment of FIG. 1 in a schematic overview.

FIG. 2 shows details of the operation of the stopping plate 121 and aligning jaws 123*a*, 123*b* and 123*c* of the exemplary embodiment of FIG. 1 in a schematic overview. FIG. 2 shows five different sections A through E which correspond to different positions of the stopping plate 121 and the aligning jaws 123*a*, 123*b* and 123*c*. As schematically shown in section A of FIG. 1, a mechanical fastener 201, such as a rivet, screw, bolt or similar enters the stopping and aligning unit 120 through the hose 111*a* of the exemplary transport means 110 of FIG. 1.

In section A of FIG. 2, the stopping plate 121 is in its first position in which the fastener 201 is decelerated and stopped by impinging on the stopping plate. To reduce or avoid damages to the fastener 201, the stopping plate 121 could comprise a plastic or rubber element (not shown in FIG. 1). In the schematic overview of FIG. 2 the fastener 201 is transported by pressurized air. The jaws in section A and section B are in a third position, wherein the shaft of e.g. a rivet can easily penetrate the aligning jaw. However, the aligning jaw is not open sufficiently yet such that the head could penetrate the aligning jaw. Consequently, the fastener is oriented in the right direction, yet may not pass the aligning jaw unintentionally.

In section B of FIG. 2, the stopping plate 121 has moved to its second position in which the supplied fastener 201 passes the stopping plate 121. The aligning jaws 123*a*, 123*b* and 123*c* are each in a (adjustable) third of three positions (the first and second positions will be explained below). With respect to aligning jaw 123*a*, which receives the supplied fastener 201, an aperture 202*a* formed by the aligning jaw 123*a* has an inner diameter which is larger than the outer diameter of the shaft of the supplied fastener 201, but smaller than the outer diameter of the head of the supplied fastener 201, in the third position of the aligning jaws 123*a*, 123*b* and 123*c*. In other words, the aligning jaw 123*a* is "half open", to allow the fastener 201 to orient in the right direction, i.e. with its shaft pointing downstream. As the stopping plate 121 is in its second position, the aligning jaw 123*a* is loaded with pressurized air which helps the fastener 201 to orient in the right direction and to penetrate the half open aligning jaw 123*a* with its shaft. In section C of FIG. 2, the stopping plate 121 has again moved to its first position, while the alignment jaws 123*a*, 123*b* and 123*c* are still in their third position. The stopping plate 121 is now blocking the supply of pressurized air to the alignment jaws 123*a*, 123*b* and 123*c* to allow the mechanical fastener 201 in the alignment jaw 123*a* to settle. In section D of FIG. 2, the aligning jaws 123*a*, 123*b* and 123*c* have transitioned to their first position in which in particular the aligning jaw 123*a* in the example of FIG. 2 aligns the supplied fastener 201, such that it may be picked by a gripping device (not shown in FIG. 2). The fastener 201 is tightened by the aligning jaw 123*a*, such that a gripping device can reliably grip the shaft of the fastener 201 from the right. As the fastener 201 is securely held in place by the aligning jaw 123*a*, an accidental slipping of the fastener 201 is avoided. Further, due to the advantageous V-shape cross-section of the aperture or opening in the jaws, the fasteners are automatically aligned. In particular, the middle axis of each fastener is always precisely aligned and in the same position, irrespective of the outer diameter of the shaft of the fastener. This facilitates the gripping of the thus provided fasteners by e.g. appropriate gripping devices that may be mounted on the same effector than the feeder mechanism.

In section E of FIG. 2, the aligning jaws 123*a*, 123*b* and 123*c* have transitioned to second position in which in particular the aligning jaw 123*a* in the example of FIG. 2 releases the supplied fastener 201. To this end, the aligning jaw 123*a* has opened sufficiently, such that the head of the fastener 201 may pass the aligning jaw 123*a*. The fastener can now be picked up by a gripping device to be transferred for example to a robot effector.

Figure 3:
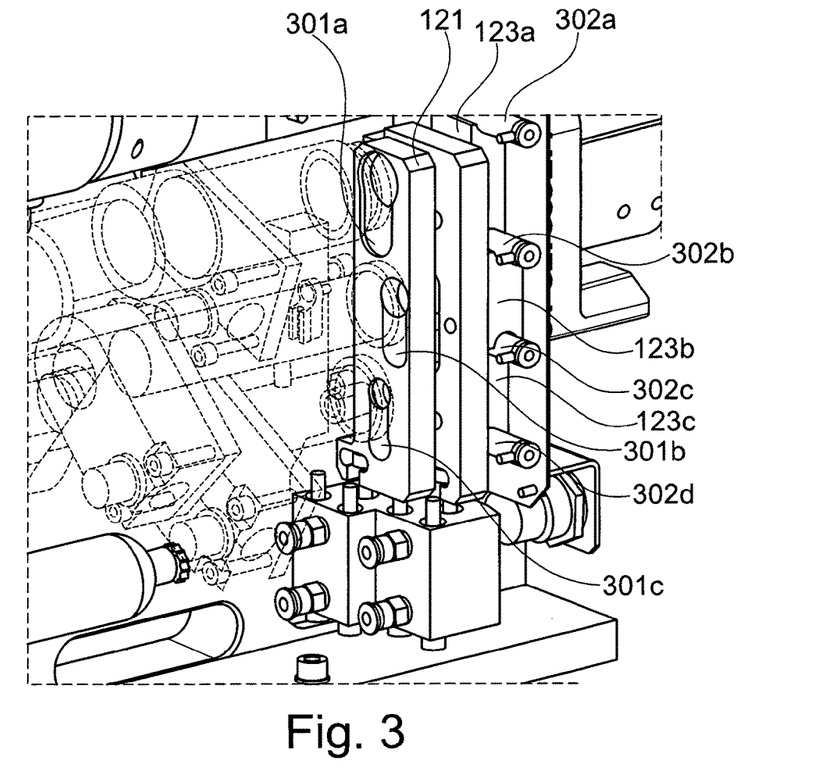
FIG. 3 shows the stopping and aligning unit of an exemplary embodiment of the feeder mechanism according to the invention in more detail.

FIG. 3 shows the stopping and aligning unit 120 of an exemplary embodiment of the feeder mechanism in more detail. In this embodiment, the stopping plate 121 comprises three plastic or rubber elements 301*a*, 301*b* and 301*c*. If the stopping plate 121 is in its first position, fasteners which are received by the stopping and aligning unit 120 from the transport means 110 impinge on one of the elements 301*a*, 301*b* and 301*c* and are decelerated. As the plastic or rubber elements have a rather soft surface, damages to the fasteners during deceleration are reduced or avoided.

In the exemplary embodiment of FIG. 3 four rails 302*a*, 302*d* are shown on which the aligning jaws 123*a*, 123*b* and 123*c* may glide when they transition between their respective positions as outlined above. This is shown in more detail in FIG. 4 where one half of each of the aligning jaws 123*a*, 123*b* and 123*c* is missing for illustrative purposes. Furthermore, the upper rail 302*a* is missing as well to demonstrate that the upper edge of aligning jaw 123*a* is complementary in shape to its corresponding rail in this exemplary embodiment.

Figure 4:
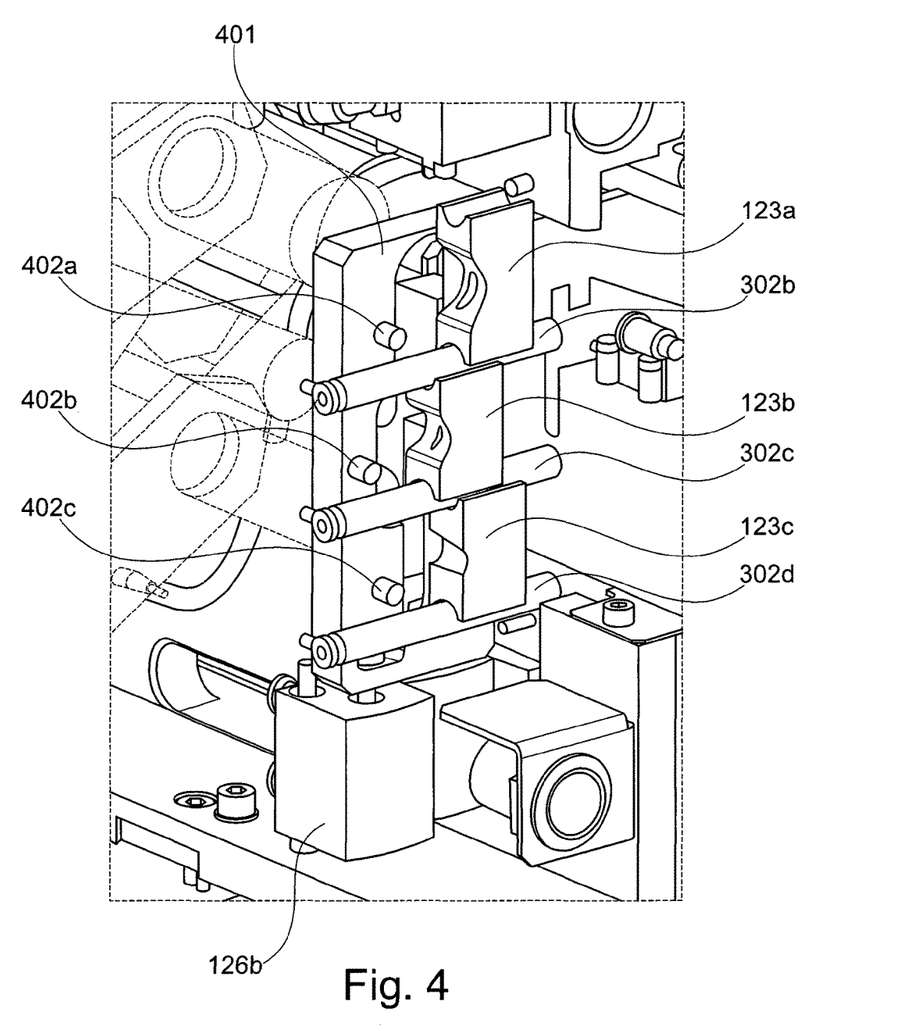
FIG. 4 shows details of a cam plate and aligning jaws of the exemplary embodiment according to the invention in more detail.

In FIG. 4 a cam plate 401 is shown. The cam plate 401 comprises a plurality of pins, three of which are shown with reference numerals 402*a*, 402*b* and 402*c*. Each of the pins 402*a*, 402*b* and 402*c* engages a corresponding cam track in one half of aligning jaws 123*a*, 123*b* and 123*c* as will be shown in more detail in FIG. 5. The respective halves of aligning jaws 123*a*, 123*b* and 123*c* are not shown in this figure. Also not shown here are three further pins, which engage the shown half of the aligning jaws 123*a*, 123*b* and 123*c*, as they are behind the respective aligning jaws 123*a*, 123*b* or 123*c*.

Figure 5:
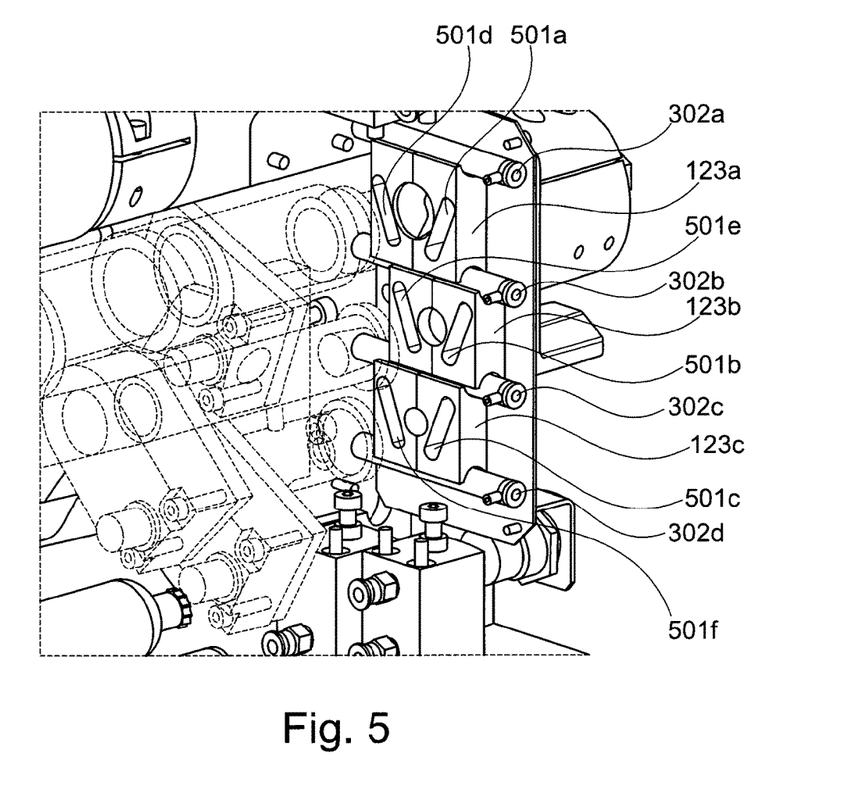
FIG. 5 shows details of the aligning jaws of the exemplary embodiment according to the invention.

FIG. 5 is a detailed view of the aligning jaws 123*a*, 123*b* and 123*c*. For illustrative purposes, the stopping plate 121 and the cam plate 401 are not shown in FIG. 5 to allow a better view of the aligning jaws 123*a*, 123*b* and 123*c*. As can be seen, each half of the aligning jaws 123*a*, 123*b* and 123*c* comprises one of cam tracks 501*a*, . . . , 501*f*. Each of the pins of the cam plate 401 shown in FIG. 4 engages one of the cam tracks 501*a*, 501*f*. For example pin 402*a* shown in FIG. 4 engages cam track 501*a* shown in FIG. 5.

A vertical movement of the cam plate 401 is transferred to the aligning jaws 123*a*, 123*b* and 123*c* by means of the pins of the cam plate 401 which engage the cam tracks 501*a*, so if of the respective halves of the aligning jaws 123*a*, 123*b* and 123c. As the tracks 501a, . . . , 501f are angled relative to the direction of movement of the cam plate 401, a vertical movement of the cam plate 401 causes a horizontal movement of each of the aligning jaws 123a, 123b and 123c along the rails 302a, 302d. Thus, the aligning jaws 123a, 123b and 123c can be made to transition through their positions as outlined with respect to FIG. 2 by a simple linear movement of the cam plate 401. The cam plate can be driven by a pneumatic cylinder 126b as shown in FIG. 4. In the shown figures both halves of the aligning jaws 123a, 123b and 123c are moved relative to each other in a defined manner. However, it would also be possible that only one half of the two halves is movable and the other half is fixed. The advantage of two moving halves is, that the centerline of the fastener, which has to be aligned, is always located at the same position.

Figure 6:
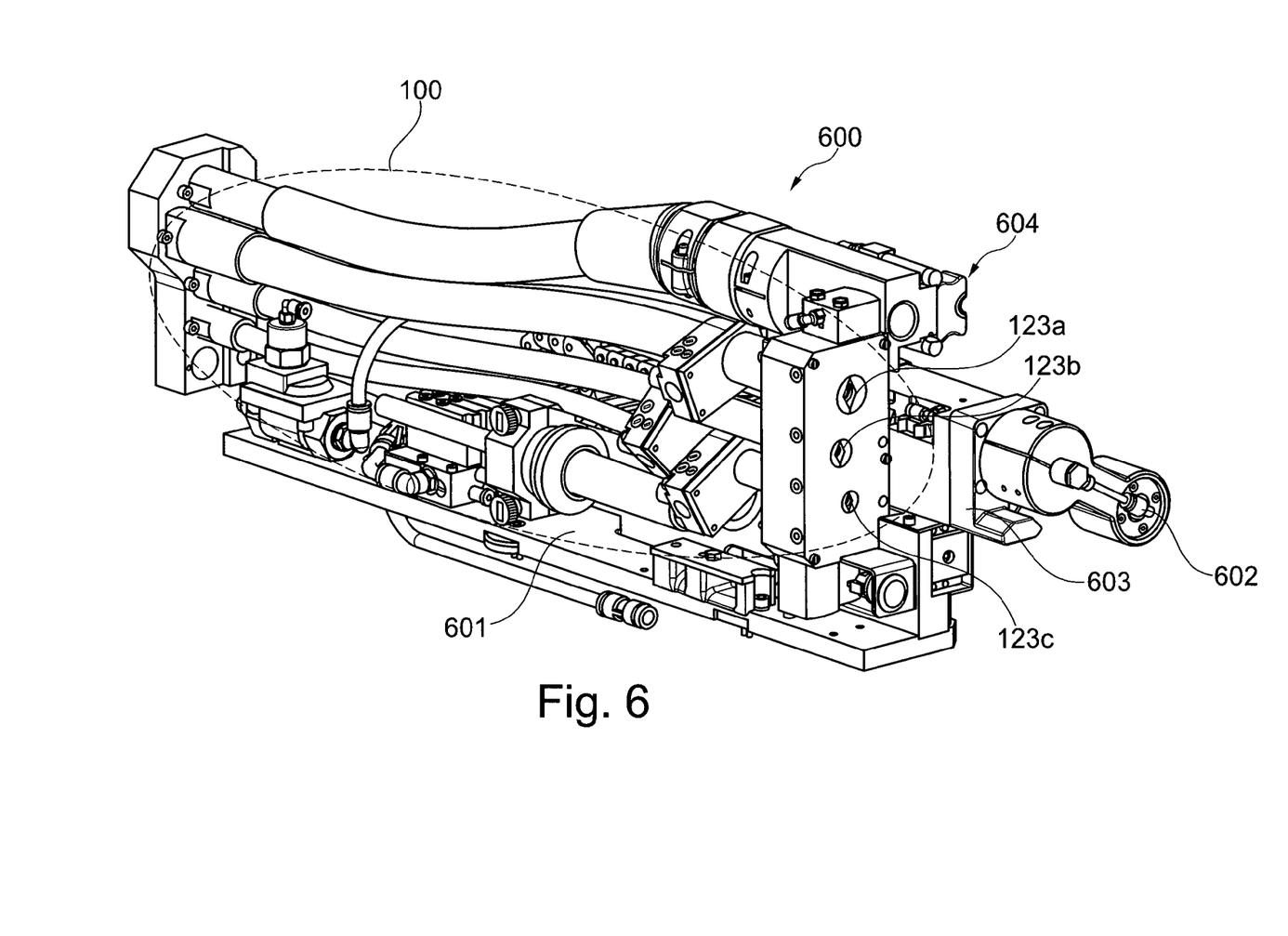
FIG. 6 shows an exemplary embodiment of a feeder mechanism according to the invention mounted on a frame of a robot effector.

FIG. 6 shows an exemplary feeder mechanism 100 according to the invention mounted on a frame 601 of a robot effector 600, i.e. the frame is supporting the feeder mechanism 100. The robot effector 600 could be part of a robot for automatic installation of mechanical fasteners and may comprise further devices for the installation of rivets, such as drilling means, measurement equipment, installation tools etc. Also mounted on the frame 601 is a gripping device with a gripping arm 602 and a motor 603. The gripping arm 602 is arranged rotatable and the arm can be rotated to each of the aligning jaws 123a, 123b and 123c. To this end, the three respective openings or outlets of the jaws are arranged on the radius that the gripping arm 602 follows, when rotating. During operation, a mechanical fastener is provided by the feeder mechanism 100 in one of its aligning jaws 123a, 123b or 123c depending on the size of the fastener as described above. Thus, the jaws form openings from which the fasteners in gripped condition protrude with at least the tip of their shaft, such that the shaft can be gripped by the gripping arm 602. While the corresponding aligning jaw is in its first position, the gripping arm 602 may grip the shaft of the fastener. Subsequently, the aligning jaws 123a, 123b or 123c transition to their second position and the fastener is released. The gripping arm may now pull the fastener out of the corresponding aligning jaw and transport the fastener for further processing.

For example, in FIG. 6 a fluid application device 604 for fasteners is shown which applies a fluid, e.g. a sealant, to the fasteners. After the gripping arm 602 has picked up the fastener from the corresponding aligning jaw, it may move the fastener by means of the motor 603 in a rotary motion to the fluid application device 604 where fluid is applied to the fastener. Subsequently, the gripping arm 602 may move the wetted fastener to an installation mechanism which installs the fastener to a workpiece. However, applying fluid to the fasteners is optional. Correspondingly, the gripping device may directly provide the fasteners picked up from one of the aligning jaws 123a, 123b or 123c to an installation mechanism.

Figure 7:
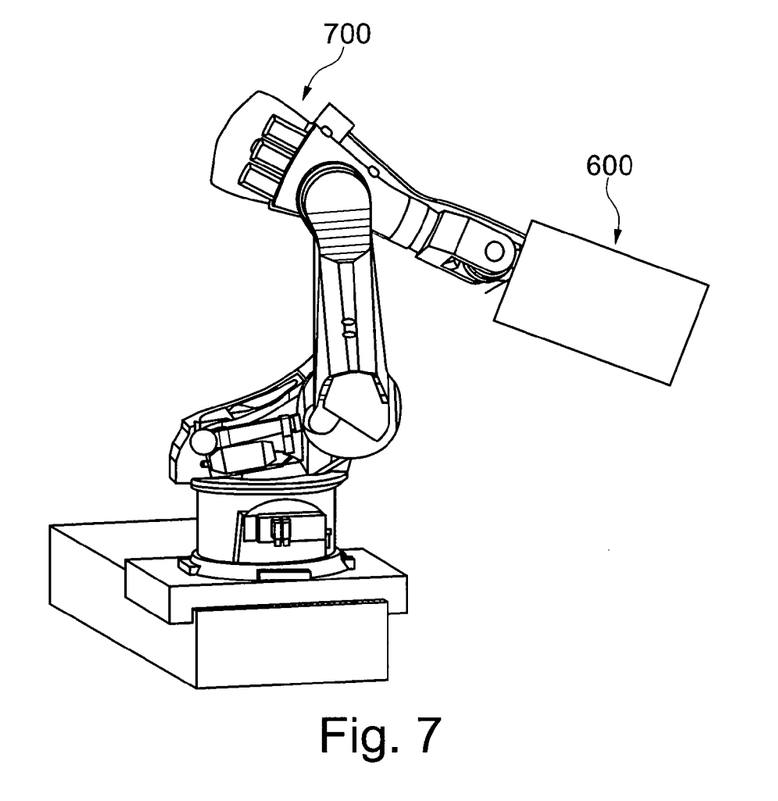
FIG. 7 shows an industrial robot being equipped with a robot effector comprising the feeder mechanism.

FIG. 7 shows, for illustrative purposes, an industrial robot 700 being equipped with the effector 600 (shown only purely schematically).

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMERALS 100 feeder mechanism
110 transport means
111a, 111b and 111c hoses
112a, 112b and 112c holding jackets
113a, 113b and 113c ring sensors
114a, 114b and 114c bushings
120 stopping and aligning unit
121 stopping plate
122a, 122b and 122c openings in stopping plate
123a, 123b and 123c aligning jaws
124 housing
125 cover plate
126a, 126b and 126c pneumatic cylinders
201 mechanical fastener
202a, 202b and 202c apertures of aligning jaws
301a, 301b and 301c plastic or rubber elements
302a, . . . , 302d rails
401 cam plate
402a, 402b and 402c pins
501a, . . . , 501f cam tracks
600 robot effector
601 frame of robot effector
602 gripping arm
603 motor
604 fluid application device
700 robot

What is claimed is:

1. A feeder mechanism for feeding mechanical fasteners, the feeder mechanism comprising:
   a transport means for transporting mechanical fasteners; and
   a stopping and aligning unit for mechanical fasteners, the stopping and aligning unit arranged downstream from the transport means and comprising:
      a stopping plate configured to have at least a first position and second position, wherein:
         in the first position a fastener supplied by the transport means is decelerated, and
         in the second position a fastener supplied by the transport means passes the stopping plate and,
      at least one aligning jaw arranged downstream from the stopping plate and configured to have at least a first position and a second position, wherein:
         in the first position the aligning jaw aligns a fastener supplied by the transport means such that the fastener may be picked by a gripping device, and
         in the second position the aligning jaw releases a fastener supplied by the transport means.

2. The feeder mechanism of claim 1, wherein the aligning jaw is configured to have a third position wherein, in the third position, an aperture formed by the aligning jaw has an inner diameter that is larger than an outer diameter of a shaft of a supplied fastener, but smaller than an outer diameter of a head of the supplied fastener.

3. The feeder mechanism of claim 2, wherein the third position of the aligning jaw is adjustable.

4. The feeder mechanism of claim 1, wherein the stopping plate comprises at least one opening through which a supplied fastener may pass when the stopping plate is in the second position.

5. The feeder mechanism of claim 1, wherein the stopping plate comprises at least one plastic or rubber element onto which a supplied fastener impinges in the first position of the stopping plate.

6. The feeder of claim 2, wherein the stopping plate is configured to transition from the second position into the first position when the aligning jaw is in the third position.

7. The feeder mechanism of claim 2, wherein the aligning jaw is configured to transition from the third position into the first position when the stopping plate is in the first position.

8. The feeder mechanism of claim 1, wherein the aligning jaw is configured to transition from the first position into the second position when the stopping plate is in the first position.

9. The feeder mechanism of claim 1, wherein:
the aligning jaw comprises a first portion and a separate second portion; and
the stopping and aligning unit further comprises at least one rail on which at least the first portion of the aligning jaw may glide.

10. The feeder mechanism of claim 9, wherein:
the first portion of the aligning jaw comprises a cam track; and
the stopping and aligning unit further comprises a cam plate with at least one pin engaging the cam track such that a movement of the cam plate causes a movement of the first portion of the aligning jaw.

11. The feeder mechanism of claim 1, wherein:
the stopping and aligning unit comprises a plurality of aligning jaws; and
each jaw is adapted to align fasteners having at least one of a specific diameter or a specific length.

12. The feeder mechanism of claim 1, wherein the transport means uses pressurized air to transport the fasteners.

13. The feeder mechanism of claim 1, wherein at least one of the stopping plate or the at least one aligning jaw is actuated pneumatically or by an electrical motor.

14. A robot end effector for installing mechanical fasteners, such as rivets, screws, bolts, and similar fasteners, the robot end effector comprising a frame supporting a feeder mechanism in accordance with claim 1.

15. The robot end effector of claim 14, wherein:
the end effector further comprises a gripping device and the feeder mechanism is configured to feed mechanical fasteners to the gripping device; and
the gripping device is rotatably supported on the frame for movement between a first position, wherein the gripping device grips a mechanical fastener from the feeder mechanism, and a second position, wherein the gripping device provides a gripped mechanical fastener to an installation mechanism.

16. A robot, comprising a robot end effector in accordance with claim 14.

* * * * *